United States Patent [19]
Furuishi et al.

[11] 3,753,094
[45] Aug. 14, 1973

[54] OHMMETER FOR MEASURING THE INTERNAL RESISTANCE OF A BATTERY AND DIRECTLY READING THE MEASURED RESISTANCE VALUE

[75] Inventors: Haruhisa Furuishi, Suita; Yasunobu Iida, Osaka; Toshiaki Fukuoka, Hirakata, all of Japan

[73] Assignee: Matsushita Electric Industrial Co. Ltd., Osaka, Japan

[22] Filed: July 24, 1972

[21] Appl. No.: 274,809

Related U.S. Application Data

[63] Continuation of Ser. No. 48,381, June 22, 1970, abandoned.

[30] Foreign Application Priority Data
July 1, 1969  Japan.............................. 44/53589

[52] U.S. Cl................. 324/29.5, 324/64, 340/249
[51] Int. Cl. ........................................... G01n 27/46
[58] Field of Search...................... 324/29.5, 62, 64; 340/249; 136/182

[56] References Cited
UNITED STATES PATENTS
2,871,446  1/1959  Wann.................................. 324/64
2,896,159  7/1959  Webster.............................. 324/64

FOREIGN PATENTS OR APPLICATIONS
901,080  1/1954  Germany............................. 324/62

Primary Examiner—Robert J. Corcoran
Attorney—Stevens, Davis, Miller & Mosher

[57] ABSTRACT

An ohmmeter for measuring the internal resistance of a battery by an A.C. method. The output of a DC power circuit is converted into an alternating current of prescribed frequency through a DC - AC conversion circuit. The alternating current flows through a battery by way of a DC blocking device and the voltage drop due to the internal resistance of the battery is introduced into an AC voltmeter circuit. The internal resistance of the battery is indicated at the indicating portion of the AC voltmeter circuit so that it is read directly.

7 Claims, 10 Drawing Figures

H. FURUISHI
Y. IIDA AND
T. FUKUOKA
INVENTORS

OHMMETER FOR MEASURING THE INTERNAL RESISTANCE OF A BATTERY AND DIRECTLY READING THE MEASURED RESISTANCE VALUE

This is a continuation, of application Ser. No. 48,381, filed June 22, 1970 and now abandoned.

The present invention relates to an ohmmeter for a battery.

The ohmmeter for a battery in accordance with the present invention is adapted to measure the internal resistance of a battery on the same principle as that of the standard for measurement brought forward by IEC (International Electrotechnical Commission).

As for the battery to be measured for internal resistance in the present invention, a storage battery can be measured as well as a dry battery such as a manganese dry cell, mercury battery and the like generally in use.

The primary object of the present invention is to provide an ohmmeter for a battery in which an alternating current flows through the battery and the voltage drop due to the internal resistance of the battery is introduced into an AC voltmeter circuit, thereby indicating the magnitude of the internal resistance of the battery so as to be directly read.

Another object of the present invention is to provide an ohmmeter for a battery in which the circuit construction is simplified so that the operation thereof may be conducted easily and it may be comfortably carried.

Still another object of the present invention is to provide an ohmmeter for a battery which is of use for checking and making uniform the quality of the batteries in the manufacturing process thereof.

Now the ohmmeter of the present invention will be described in comparison with the conventional type of ohmmeter of this kind in conjunction with the accompanying drawings in which.

Figure 3:
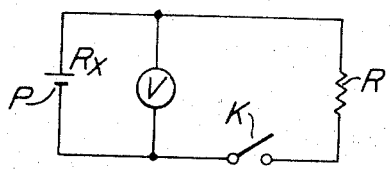
Figure 4:
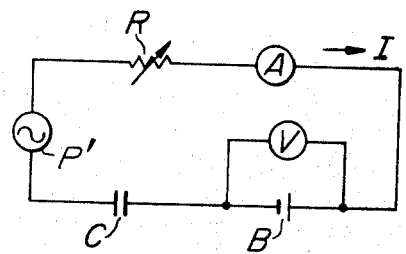
Figure 5:
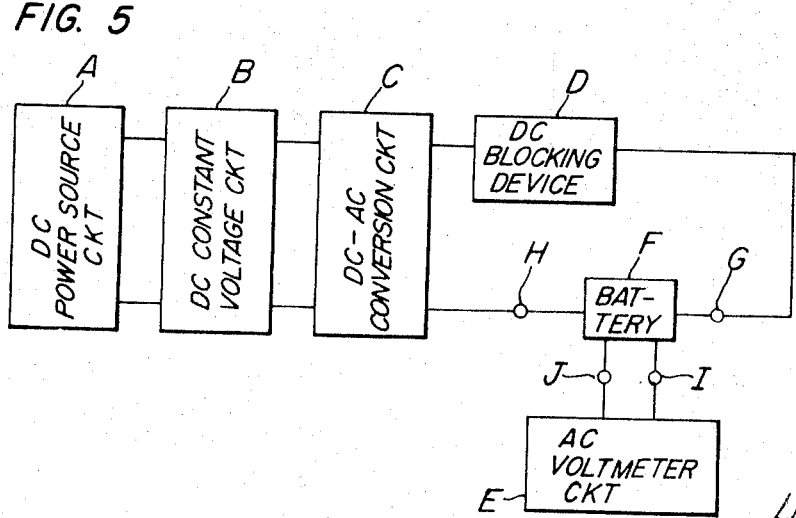
Figure 6:
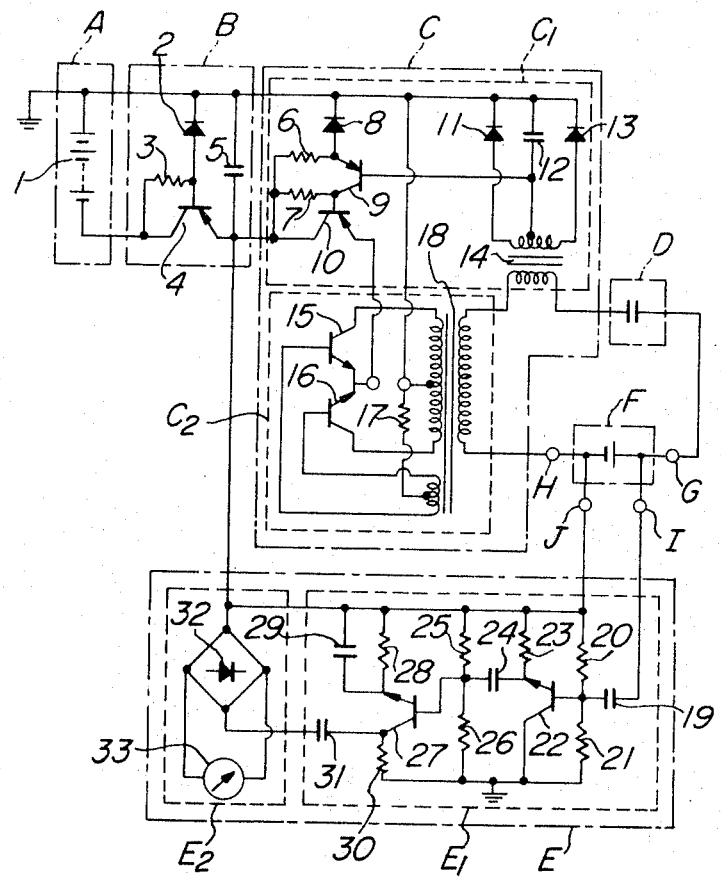
Figure 7:
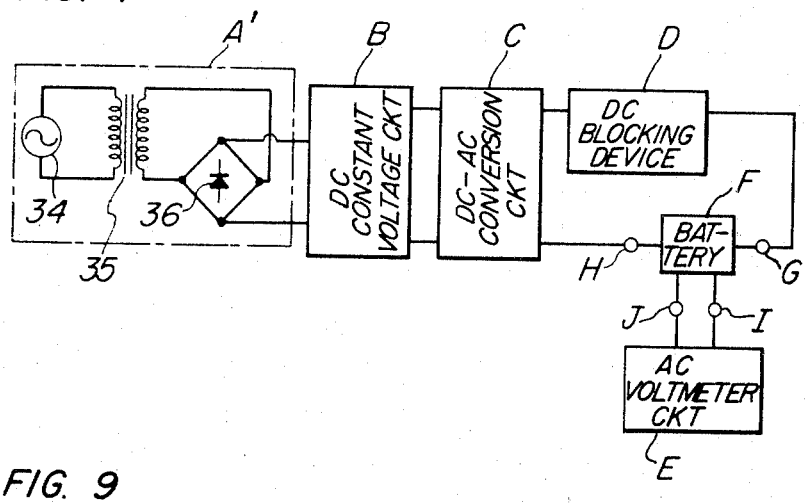
Figure 9:
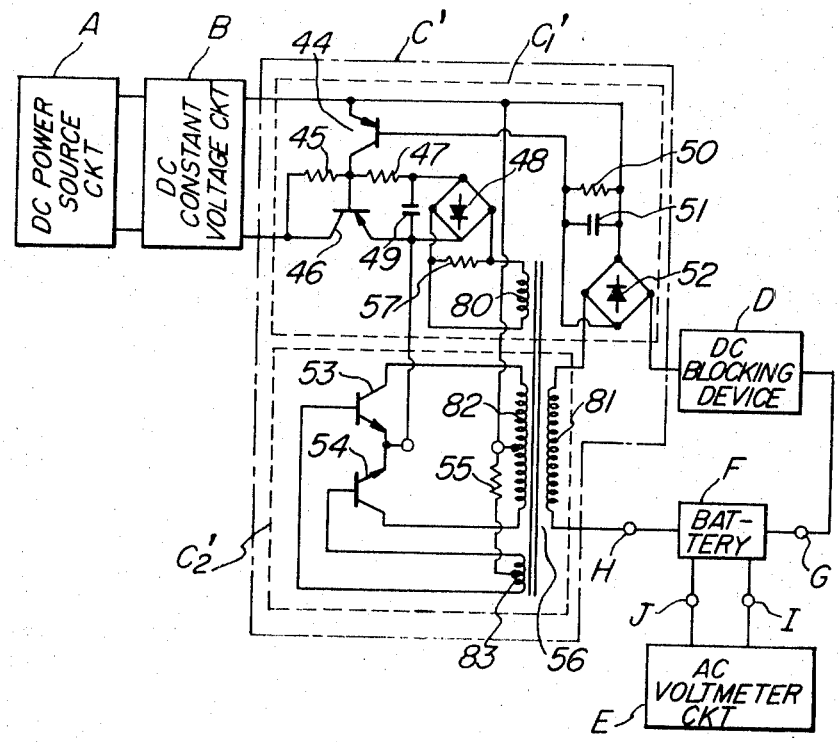
Figure 8:
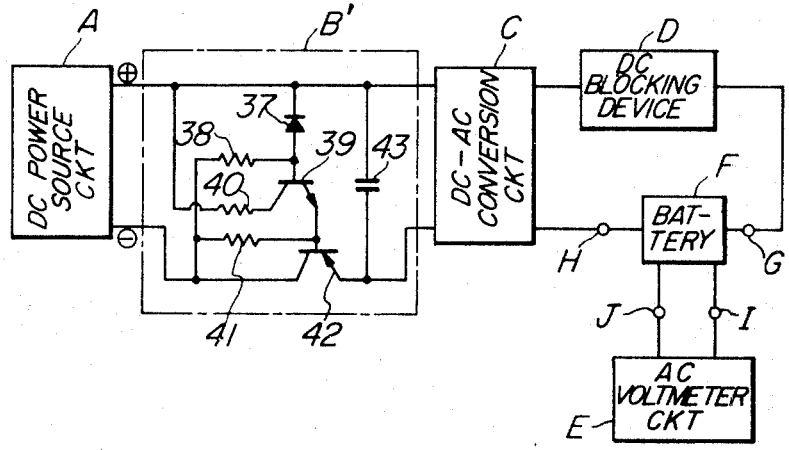
Figure 10:
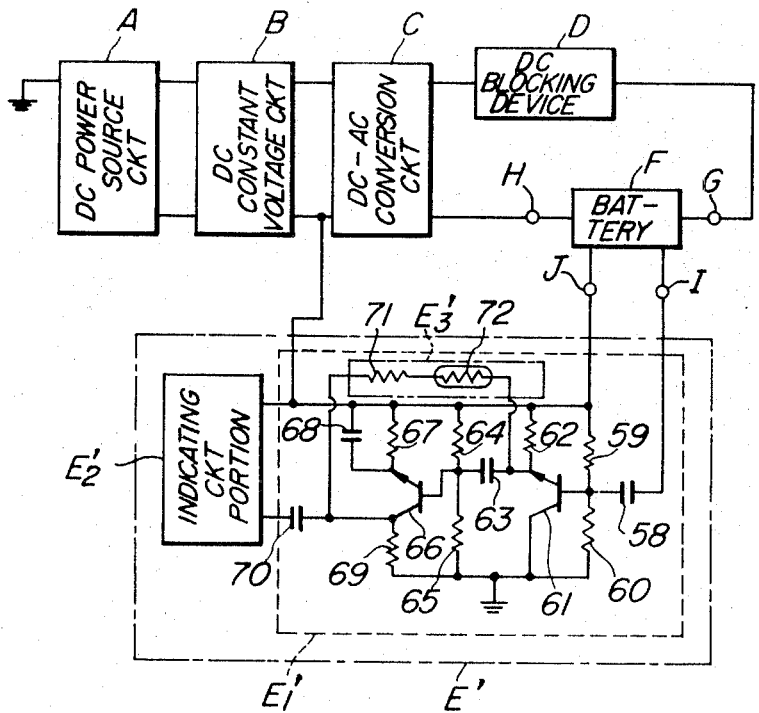

FIG. 3 is a schematic diagram of the circuit of still another conventional ohmmeter, FIG. 4 is a diagram of the electrical circuit for explanation of the principle of the ohmmeter for a battery in accordance with the present invention, FIG. 5 is a block diagram of the ohmmeter is accordance with an embodiment of the present invention, FIG. 6 is a view of the electrical circuit of the ohmmeter in accordance with the embodiment of the present invention shown in FIG. 5, FIG. 7 is a block diagram of the ohmmeter in accordance with another embodiment of the present invention in which the DC power circuit in the ohmmeter shown in FIG. 6 is modified, FIG. 8 is a block diagram of the ohmmeter in accordance with still another embodiment of the present invention in which the DC constant-voltage circuit in the ohmmeter shown in FIG. 6 is modified, FIG. 9 is a block diagram of the ohmmeter in accordance with still another embodiment of the present invention in which the constant-current type DC - AC conversion circuit in the ohmmeter shown in FIG. 6 is modified, and FIG. 10 is a block diagram of the ohmmeter in accordance with a further embodiment of the present invention in which the AC voltmeter circuit in the ohmmeter shown in FIG. 6 is modified.

There are two methods of measuring the internal resistance of a battery, that is, AC method and DC method. In both methods, there are disadvantages in that the meter should be adjusted, the measured value should be calculated, or a precise measurement cannot be made, in the event that the conventional bridge method or voltmeter method is applied.

Figure 1:
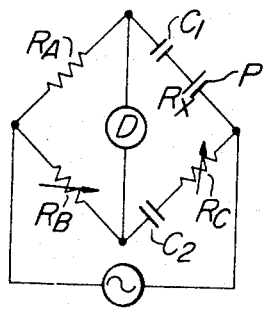
FIG. 1 is a schematic diagram of the circuit of the conventional ohmmeter.

For instance, the Kohlrausch bridge method will be described as an example of the measurement by the AC method. In this method, the battery to be measured P is connected in one side of a bridge circuit as shown in FIG. 1. The variable resistances $R_B$, $R_C$ are controlled to balance the circuit so that the current may not flow through the detector D in the circuit. The internal resistance $R_X$ of the battery P is determined by the following balance formula $$R_X = R_A \cdot R_C/R_B$$

in which the value of the variable resistances $R_B$ and $R_C$ is taken under balanced conditions. The condensers $C_1$ and $C_2$ are blocking condensers for blocking the direct current from the battery P.

Figure 2:
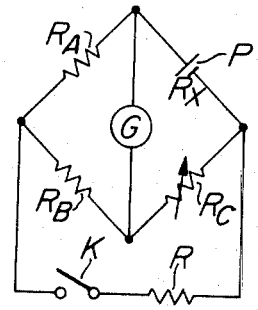
FIG. 2 is a schematic diagram of the circuit of another conventional ohmmeter.

As an example of the measurement of the resistance of the battery by the DC method, Mance's method will now be described. In this method, the battery to be measured P is connected in one side of a Wheatstone bridge circuit as shown in FIG. 2. The variable resistance $R_C$ is controlled so that the galvanometer G may not be effected by the switching on and off of the switch K. Under the balanced condition, the internal resistance $R_X$ of the battery P is determined by the following formula $$R_X = R_A \cdot R_C/R_B$$

The voltmeter method will now be described hereinbelow. The battery P to be measured, a voltmeter V and a known resistor R are connected in the circuit as shown in FIG. 3. First, the voltage across the battery is measured with the switch K being opened. The measured voltage is indicated as Eo. Then, the voltage across the battery is measured with the switch K being closed. The measured voltage with the closed switch K is indicated as Vo. In the case that the internal resistance of the voltmeter is much larger than the internal resistance of the battery $R_X$ and the resistance R, the internal resistance $R_X$ of the battery is determined by the following formula:

$$R_X = (Eo - Vo)/Vo \, R$$

It should be however noticed that the measurement of the voltage Vo across the battery with the closed switch K should be promptly conducted before the polarization of the battery commences.

As apparent from the above description regarding the prior art method of measuring the internal resistance of the battery, adjustment or calculation has been necessitated in the prior art.

The present invention overcomes the above defects of the prior art. The principle thereof will now be described hereinbelow. As shown in FIG. 4, a resistor R, a DC blocking condenser C and the battery B to be measured are connected in series across an AC power source P'. The voltge drop by the internal resistance $R_X$ of the battery B is measured with a voltmeter V coupled in parallel with the battery B. The internal resistance $R_X$ is determined by the following formula $$R_X = V_o/I$$

where $V_o$ is the measured voltage across the battery. Therefore, when the current $I$ is constant, $$R_X \quad V_o$$

and the internal resistance $R_X$ may be indicated by the voltmeter using a scale of resistance. Thus, the internal resistance $R_X$ can be directly read on the meter.

Now the present invention will be described in detail with reference to some embodiments thereof. In FIG. 5, the principal arrangement of the embodiments is shown with a block diagram, in which the reference character A indicates a DC power source circuit, B indicates a DC constant voltage circuit, C indicates a constant current type DC - AC conversion circuit, D a DC blocking device, E an AC volt-meter circuit, F a battery to be meauured, G, H current terminals of the battery, and I and J indicate the voltage terminals of the battery to be measured.

In the above-described arrangement of the circuit, when an inconstant voltage provided by the DC power source circuit A is supplied to the DC constant voltage circuit B, the voltage is controlled to be constant and put into the constant current type DC - AC conversion circuit C as an input power. By means of this constant current type DC - AC conversion circuit C, the direct current is converted into an alternating current (of sine wave form) having a prescribed frequency, and the alternating current flows through the battery connected between the current terminals G and H by way of the DC blocking device D. At this time, the voltage across the battery F measured between the voltage terminals I and J drops due to the internal resistance thereof. The voltage across the battery is put into the AC voltmeter circuit E of high input inpedance as the detection input. Accordingly, if the indicator of the voltmeter circuit E is provided with a resistance indicating scale, the indication of the pointer becomes the indication in ohms of the internal resistance of the battery.

Now an embodiment of the ohmmeter in accordance with the present invention will be described in detail referring to FIG. 6. In the embodiment, the DC power source circuit A includes batteries 1 so that the ohmmeter may be able to be used without a commercial AC power source. The DC constant voltage circuit B consists of a constant voltage diode 2, a transistor 4, a resistor 3, and a capacitor 5 connected as shown in FIG. 6, and automatically controls the voltage across the battery 1 by suppressing the fluctuation thereof to provide a stable constant voltage power source.

The constant current type DC - AC conversion circuit C consists of a voltage controlling circuit $C_1$ and a push-pull type DC - AC conversion circuit $C_2$ combined with the former. The voltage controlling circuit $C_1$ consists of a constant voltage diode 8, transistors 9 and 10, diodes 11 and 13, a current transformer 14, resistors 6 and 7, and a capacitor 12 connected as shown in FIG. 6. The push-pull type DC - AC conversion circuit $C_2$ consists of transistors 15 and 16, an oscillation transformer 18 and a resistor 17 connected as shown in the drawing. Through this DC - AC conversion circuit C, a constant alternating current of a prescribed frequency, e.g., a sine wave of 10 mA and 1,000 cycles, is applied to the battery F as a load. The AC voltmeter circuit E consists of an AC amplification circuit portion $E_1$ and an indicating circuit portion $E_2$.

The AC amplification circuit portion $E_1$ is a CR coupling amplification circuit composed of a collector grounded circuit of high input impedance consisting of a transistor 22, resistors 20, 21 and 23, and capacitors 19 and 24 connected as shown in FIG. 6, and a high amplification transistor circuit consisting of a transistor 27 having an emitter grounded through the low AC impedance of capacitors 29 and 5 and resistors 25, 26, 28 and 30, connected as shown in the drawing. The constant DC voltage used for this circuit $E_1$ is obtained at the output terminals of the DC constant voltage circit B. When the constant alternating current flows through the battery F between the current terminals G and H, the voltage drop due to the internal resistance of the battery can be detected at the voltage terminals I and J. The indicating circuit portion $E_2$ of the AC voltmeter circuit E consists of a semi-conductor rectifier 32 and a DC meter 33 connected as shown in FIG. 6, and rectifies the output current amplified by the AC amplification circuit $E_1$ so that the pointer in the DC meter 33 provided with a resistance scale indicates the internal resistance of the battery F. The DC blocking device D consisting of a non-polarization capacitor is connected in series between the constant current type DC - AC conversion circuit D and the battery F to block the direct current flowing from the latter. The voltage of the battery is limited by the withstandable voltage range of the non-polarization capacitor. As for the terminals for measurement, the four-terminal means including current terminals and voltage terminals is adopted.

In FIG. 7, a modification of the ohmmeter shown in FIG. 6 is illustrated. In this modification, a DC power circuit A' consisting of a commercial AC power source 34, a transformer 35 and a semiconductor rectifier 36 is substituted for the DC power source circuit A so that the ohmmeter may be used for a long time with a commercial AC power source.

In FIG. 8 a modification of the ohmmeter shown in FIG. 6 is illustrated with a block diagram, in which a DC constant voltage circuit B' consisting of a constant voltage diode 37, transistors 39 and 42, resistors 38, 40 and 41, and a capacitor 43 connected as shown in the drawing is substituted for the DC constant voltage circuit B.

In the DC constant voltage circuit B in the ohmmeter shown in FIG. 6, when the voltage across the emitter and base of the transistor 4 varies due to temperature variation, the output voltage is varied, which results in error in indication. In order to prevent the error in indication due to the temperature variation, another transistor 39 of a different type is connected with the transistor 42 so that the variation in voltage due to the temperature variation across the emitter and base of the respective transistors 39 and 42 may cancel each other. Thus, the output voltage is stabilized for the effect of the variation in temperature. The above stabilization can be simply explained by the following formulae (1) and (2). The relation between the output voltage $E_L$ of the DC constant voltage circuit B, the terminal voltage $E_Z$ of the constant voltage diode 2 and the voltage $E_{BE}$ across the emitter and base of the transistor 4 is $$E_L = E_Z - E_{BE} \dots \dots \dots \dots \quad (1)$$

and the relation between the output $E_L'$ of the DC constant voltage circuit B', the terminal voltage $E_Z'$ of the constant voltage diode 37, the voltage $E_{BE}'$ across the emitter and base of the transistor 42, and the voltage $E_{BE}''$ across the emitter and base of the transistor 39 is $$E_L' = E_Z' - E_{BE}' + E_{BE}'' \ldots \ldots \quad (2)$$

Accordingly, if the transistors 39 and 42 are selected so that the relation $E_{BE}' \approx E_{BE}''$ is satisfied, the formula (2) becomes $E_L' \approx E_Z'$, which makes the output voltage be independent of the voltage across the emitter and base of the transistors.

Inthe circuit connetion of the DC constant voltage circuit B', the transistor 42 is connected in series between the DC power source A and the constant current type DC - AC conversion circuit C. The collector of the transistor 42 is connected with the negative side of the DC power source A, the emitter thereof is connected with the constant current type DC - AC conversion circuit C, and the base thereof is connected with the emitter of the transistor 39 and connected through a resistor 41 with the negative side of the DC power source A. The baseof the transistor 39 is connected with the positive side of the DC power source A through a constant voltage diode 37 and connected with the negative side of the DC power source A through a resistor 38. The collector of the transistor 39 is connected with the positive side of the DC power source A through a resistor 40.

In FIG. 9, another embodiment of the ohmmeter of the present invention is shown in which the ohmmeter shown in FIG. 6 is modified. The constant current type DC - AC conversion circuit C in the ohmmeter shown in FIG. 6 is substituted for by a modified constant current type DC- AC conversion circuit C'. The constant current type DC - AC conversion circuit C' consists of a voltage control circuit $C_1'$ and a push-pull type DC - AC conversion circuit $C_2'$. The voltage control circuit $C_1'$ consists of a control circuit consisting of a detecting transistor 44, a control transistor 46 and resistors 45 and 47, a voltage feedback circuit consisting of a rectifier 48 for rectifying the feedback voltage across the third coil 80 of the oscillation transformer 56 to put signals into the base of the control transistor 46, a resistor 57, a capacitor 49 and the third coil 80, and a current feedback circuit consisting of a rectifier 52 for rectifying the feedback current through the second coil 81 of the oscillation transformer 56 to put the signals into the base of the detection transistor 46, a resistor 50 and a capacitor 51. The push-pull type DC - AC conversion circuit $C_2'$ consists of transistors 53 and 54, a collector coil 82, a base coil 83, the foregoing second and third coils 81 and 80, an oscillation transformer 56 and a resistor 55 connected as shown in FIG. 9. While in the constant current type DC - AC conversion circuit C in the ohmmeter shown in FIG. 6 the input into the DC - AC conversion circuit $C_2$ is controlled only by the current feedback to make the load current constant, in the constant current type DC - AC conversion circuit C' in the ohmmeter shown in FIG. 9 the input into the DC - AC conversion circuit $C_2'$ is controlled by both the voltage and current feedbacks to make the load current constant. Therefore, in the ohmmeter in accordance with the embodiment shown in FIG. 9, the efficiency of control is much improved and the synchronization can be easily conducted between the oscillation and the load current. Accordingly, a precise measurement can be accomplished in the case that a synchronous rectifier circuit is substituted for the rectifier 32 for converting the AC output from the AC amplification circuit portion $E_1$ into the direct current in the AC voltmeter E.

The constant current operation of the circuit C' will now be described hereinbelow.

In the event that the load current is reduced, the voltage drop across the resistor 50 is reduced and the base potential of the detection transistor 44 is lowered. Accordingly, the collector current is reduced and the voltage drop across the resistor 45 is reduced, and the voltage across the base and emitter of the control transistor 46 is raised, which results in reduction in the voltage across the emitter and collector of the control transistor 46 and an increase in the input voltage in the DC - AC conversion circuit $C_2'$.

On the other hand, if the load current is reduced, the output voltage is raised due to the lightload at the oscillation transformer 56. Then the voltage across the resistor 57 is raised and the DC voltage rectified through the rectifier 48 is also raised resulting in the rise of the voltage across the base and emitter of the control transistor 46. On account of the above, the voltage across the collector and emitter is lowered and the input voltage of the DC - AC conversion circuit $C_2'$ is raised. In response to the rising of the input voltage of the DC - AC conversion circuit $C_2'$, the output voltage is raised and the output current (load current) is increased to return to its initial condition. In the case that the load current is increased, entirely the reverse operation is conducted.

In FIG. 10, another embodiment of the present invention is shown in which the AC amplification circuit $E_1$ in the AC voltmeter circuit E of the ohmmeter embodiment shown in FIG. 6 is substituted for by an AC amplification circuit $E_1'$ consisting of transistors 61 and 66, resistors 59, 60, 62, 64, 65, 67, 69 and 71, capacitors 58, 63, 68 and 70, and a resistance element 72 having a negative temperature coefficient. The AC amplification circuit $E_1'$ corresponds to a circuit consisting of the AC amplification circuit $E_1$ and a negative feedback circuit $E_3'$ connected between the emitter of the transistor 22 and the collector of the transistor 27 in the circuit $E_1$ (FIG. 6). In FIG. 10, the negative feedback circuit $E_3'$ is connected between the emitter of the transistor 61 and the collector of the transistor 66. By the provision of the negative feedback circuit $E_3'$ the temperature characteristic is improved. Since the coefficient of the temperature characteristic of the AC amplification circuit $E_1$ shown in FIG. 6 is positive, the negative feedback circuit $E_3'$ having a negative temperature coefficient is disposed between the emitter of the transistor 61 and the collector of the transistor 66 in the AC amplification circuit $E_1'$ as shown in FIG. 10 in order to compensate the positive temperature variation. The negative feedback circuit $E_3'$ is composed of a thermistor 72 and a resistor 71 connected in series for providing a proper negative temperature coefficient.

In accordance with the present invention as described above, it is possible to read directly the internal resistance of a battery through a wide range and with high accuracy. Furthermore, the ohmmeter can be made into a compact portable size and it can be operated with a DC power source as well as an AC power source. The ohmmeter in accordance with the present

What is claimed is:

1. An ohmmeter for measuring the internal resistance of a battery comprising
   a DC power source circuit;
   a DC constant voltage circuit for producing a DC constant voltage output from the DC power of said DC power source circuit,
   a DC-AC conversion circuit for converting said DC constant voltage output to an AC constant current having a relatively high frequency; said DC constant voltage circuit being a series-type constant voltage circuit comprising a control transistor having a collector connected to one output terminal of said DC power source circuit, an emitter connected to one input terminal of said DC-AC conversion circuit, and a base connected to said one output terminal of said DC power source circuit through a resistor; and a reference transistor having an emitter connected to the base of said control transistor and a base connected to the other output terminal of said DC power source circuit through a constant voltage diode and also to said one output terminal of said DC power source circuit through another resistor;
   a DC blocking device, said AC constant current being applied to a battery to be measured through said DC blocking device, said DC blocking device preventing DC current from flowing from the battery; and
   an AC voltmeter circuit including an indicator connected across the battery for measuring the AC voltage drop of the battery due to its internal resistance, said indicator of said AC voltmeter circuit being adapted to indicate directly the internal resistance of the battery.

2. An ohmmeter for measuring the internal impedance of a battery according to claim 1 wherein said control transistor and reference transistor have the same temperature characteristic with respect to the voltage across the emitter and base thereof, and one of said transistors is of PNP type and the other of said transistor is of NPN type.

3. An ohmmeter for measuring the internal resistance of a battery comprising
   a DC power source circuit;
   a DC constant voltage circuit for producing a DC constant voltage output from the DC power of said DC power source circuit;
   a DC-AC conversion circuit for converting said DC constant voltage output to an AC output of a constant current having a sine wave of a predetermined frequency, said DC-AC conversion circuit including means for maintaining the current and voltage of said AC output at constant; and further comprising means for converting the DC voltage to an AC voltage, said converting means including an oscillation transformer having a secondary coil for producing said AC constant current and a control circuit connected in circuit between said DC constant voltage circuit and said converting means for controlling said DC constant voltage produced by said DC constant voltage circuit in accordance with a feed-back current and a feed-back voltage supplied from said converting means thereby applying the controlled DC constant voltage to said converting means; current feed-back means including a first circuit connected between said secondary coil and the battery to be measured for taking out a current component relating to said AC constant current applied to said battery, and a rectifying circuit connected between said first circuit and said control circuit for producing said feed-back current by rectifying said current component; and voltage feed-back means including a third coil of said oscillation transformer for taking out a voltage component proportional to a voltage induced to said secondary coil, and a rectifying circuit connected between said third coil and said control circuit for producing said feed-back voltage by rectifying said voltage component;
   a DC blocking device, said AC constant current being applied to a battery to be measured through said DC blocking device, said DC blocking device preventing DC current from flowing from the battery; and
   an AC voltmeter circuit including an indicator connected across the battery for measuring the AC voltage drop of the battery due to its internal resistance, said indicator of said AC voltmeter circuit being adapted to indicate directly the internal resistance of the battery.

4. An ohmmeter for measuring the internal resistance of a battery comprising: A DC power source circuit;
   a DC constant voltage circuit including a first control transistor connected in series between said DC power source and a voltage control circuit for producing a DC constant voltage from the DC power of said DC power source circuit;
   a DC-AC conversion circuit comprising said DC voltage control circuit and an oscillation circuit, said DC voltage control circuit including a second control transistor connected in series between said DC constant voltage circuit and said oscillation circuit for controlling said DC constant voltage thereby supplying said oscillation circuit with a DC controlled voltage, and said oscillation circuit including a pair of push-pull connected output transistors for converting said DC controlled voltage to an AC controlled voltage and a transformer having a primary winding connected to said pair of output transistors and a secondary winding for producing an AC output voltage proportional to said AC controlled voltage;
   connecting means for connecting said secondary winding to a battery to be measured, said means including a DC blocking device for preventing DC current from flowing from said connected battery and terminal means including current and voltage terminals for supplying said connected battery with a current from said output voltage of said secondary winding through said current terminals and takingout the voltage drop of said connected battery through said voltage terminals;
   means for detecting variation of said current supplied to said battery through said connecting means and applying a signal relating to said variation to said second control transistor for controlling the same; and
   indicator means comprising an AC amplifier connected to said voltage terminals for amplifying said voltage drop of said battery and an indicator circuit including a rectifier and an indicator connected to said amplifier through said rectifier for indicating directly the internal resistance of said battery by measuring said amplified voltage drop after rectification.

5. An ohmmeter according to claim 4, wherein said DC power source circuit includes a battery as a DC power source and said DC blocking device includes a non-polarized capacitor.

6. An ohmmeter according to claim 4, wherein said AC amplifier of said indicator means includes an input transistor having a collector connected to ground thereby providing a large input impedance, an output transistor having an emitter connected to ground through a low AC impedance thereby providing a high amplification factor and negative feedback means including a resistance element having a negative temperature coefficient for connecting the collector of said output transistor to the emitter of said input transistor.

7. An ohmmeter according to claim 4, wherein said terminal means includes a pair of said current terminals adapted to be connected across said battery to be measured and a pair of said voltage terminals adapted to take out the voltage drop of said connected battery.

* * * * *